(12) United States Patent
Bunker et al.

(10) Patent No.: US 10,384,937 B2
(45) Date of Patent: Aug. 20, 2019

(54) METHOD OF GENERATING HYDROGEN FROM THE REACTION OF STABILIZED ALUMINUM NANOPARTICLES WITH WATER AND METHOD OF FORMING STABILIZED ALUMINUM NANOPARTICLES

(71) Applicants: University of Dayton, Dayton, OH (US); Government of the United States as represented by the Secretary of the Air Force, Wright-Patterson AFB, OH (US)

(72) Inventors: Christopher E. Bunker, Kettering, OH (US); K. A. Shiral Fernando, Dayton, OH (US); Elena A. Guliants, Beavercreek, OH (US); Marcus J. Smith, Dayton, OH (US); Barbara A. Harruff, Kettering, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 580 days.

(21) Appl. No.: 14/664,142

(22) Filed: Mar. 20, 2015

(65) Prior Publication Data
US 2015/0266730 A1 Sep. 24, 2015

Related U.S. Application Data

(62) Division of application No. 12/791,900, filed on Jun. 2, 2010, now Pat. No. 9,011,572.

(Continued)

(51) Int. Cl.
*C01B 3/04* (2006.01)
*C01B 3/08* (2006.01)
*B22F 9/24* (2006.01)

(52) U.S. Cl.
CPC .................. *C01B 3/08* (2013.01); *B22F 9/24* (2013.01); *C01B 3/042* (2013.01); *Y02E 60/36* (2013.01);

(Continued)

(58) Field of Classification Search
None
See application file for complete search history.

(56) References Cited

U.S. PATENT DOCUMENTS 5,984,996 A 11/1999 Gonsalves et al.
6,179,899 B1 * 1/2001 Higa .................... B22F 9/24
75/362

(Continued)

OTHER PUBLICATIONS

Wang, H.Z. et al., A Review on hydrogen produciton using aluminum and aluminum alloys, Renewable and Sustainable Energy Reviews, vol. 13, pp. 845-853, May 2009.*

(Continued)

*Primary Examiner* — George Wyszomierski
(74) *Attorney, Agent, or Firm* — AFMCLO/JAZ; Chastity Whitaker

(57) ABSTRACT

A method of generating hydrogen gas from the reaction of stabilized aluminum nanoparticles with water is provided. The stabilized aluminum nanoparticles are synthesized from decomposition of an alane precursor in the presence of a catalyst and an organic passivation agent, and exhibit stability in air and solvents but are reactive with water. The reaction of the aluminum nanoparticles with water produces a hydrogen yield of at least 85%.

16 Claims, 7 Drawing Sheets

Related U.S. Application Data

(60) Provisional application No. 61/183,229, filed on Jun. 2, 2009.

(52) U.S. Cl.
CPC ........ *Y10S 977/773* (2013.01); *Y10S 977/775* (2013.01); *Y10S 977/777* (2013.01)

(56) References Cited

U.S. PATENT DOCUMENTS

| | | | |
|---|---|---|---|
| 7,192,649 B1 | 3/2007 | Jouet et al. | |
| 2005/0235776 A1 | 10/2005 | He et al. | |
| 2008/0019903 A1* | 1/2008 | Wegner | B01J 4/002 423/657 |
| 2009/0252671 A1* | 10/2009 | Fullerton | B01J 7/02 423/657 |
| 2012/0027671 A1* | 2/2012 | Wang | C01B 3/08 423/657 |

OTHER PUBLICATIONS

Suslick, Kenneth S., "Sonochemistry," Science, New Series, vol. 247, No. 4949; Mar. 23, 1990; pp. 1439-1445.

Porzorov, et al., "Sonochemical doping of %i-catalyzed sodium aluminum hydride," Journal of Alloys or Compounds, 419 (2006), pp. 162-171.

Hawley's Condensed Chemical Dictionary, 14th edition, John Wiley & Sons, 2002, term: sodium aluminum hydride.

Joel A. Haber and William E. Buhro, "Kinetic Instability of Nanocrystalline Aluminum Prepared by Chemical Synthesis; Facile Room-Temperature Grain Growth," Journal of the American Chemical Society, 1998, 120, pp. 10847-10855 (published on Web Oct. 13, 1998).

Mahendiran, C., et al; Sonoelectrochemical Synthesis of Metallic Aluminum Nanoparticles; Eur. J. Inorg. Chem.; 2009; pp. 2050-2053.

Normatov, I., et al.; Preparation of Benzene-Stabilized Aluminum Nanoparticles in Hydrogen Atmosphere; Inorganic Materials; 2001; pp. 1002-1005; vol. 37; No. 10.

Eliezer, S., et al; Synthesis of nanoparticles with femtosecond laser pulses; Physical Review B; 2004; pp. 144119-144119-6; 69; The American Physical Society.

Li, H. et al.; Templated Synthesis of Aluminum Nanoparticles—A New Route to Stable Energetic Materials; The Journal of Physical Chemistry C; 2009; pp. 20539-20542; American Chemical Society.

Chung, S. et al.; Capping and Passivation of Aluminum Nanoparticles Using Alkyl-Substituted Expoxides; Langmuir, 2009; pp. 8883-8887; 25 (16) American Chemical Society.

Meziani, M. et al.; Formation and Properties of Stabilized Aluminum Nanoparticles; ACS Applied Materials & Interfaces; 2009; pp. 703-709; vol. 1; No. 3.

Bunker, C. et al; Spontaneous Hydrogen Generation from Organic-Capped Al Nanoparticles and Water; ACS Applied Materials & Interfaces; 2010; pp. 11-14; vol. 2; No. 1.

Fernando, K. et al.; Sonochemically Assisted Thermal Decomposition of Alane N, N-Dimethylethylamine with Titanium (IV) Isopropoxide in the Presence of Oleic Acid to Yield Air-Stable and Size-Selective Aluminum Core-Shell Nanoparticles; The Journal of Physcial Chemistry C; 2009; pp. 500-503; 113; American Chemical Society.

Lewis, W. et al.; Multispectroscopic (FTIR, XPS, and TOFMS-TPD) Investigation of the Core-Shell Bonding in Sonochemically Prepared Aluminum Nanoparticles Capped with Oleic Acid; Journal of Physcial Chemistry C; 2010; pp. 6377-6380; 114 (14); American Chemical Society.

* cited by examiner

METHOD OF GENERATING HYDROGEN FROM THE REACTION OF STABILIZED ALUMINUM NANOPARTICLES WITH WATER AND METHOD OF FORMING STABILIZED ALUMINUM NANOPARTICLES

CROSS-REFERENCE TO RELATED APPLICATIONS

This application is a divisional of U.S. application Ser. No. 12/791,900, filed Jun. 2, 2010, now U.S. Pat. No. 9,011,572, which claims the benefit of U.S. Provisional Application No. 61/183,229, filed Jun. 2, 2009, entitled GENERATION OF HYDROGEN FROM REACTION OF ALUMINUM-ORGANIC CORE SHELL NANOPARTICLES AND WATER. The entire contents of said applications are hereby incorporated by reference.

STATEMENT REGARDING FEDERALLY SPONSORED RESEARCH OR DEVELOPMENT

This invention was made with government support under Contract No. F33615-03-02-2347 awarded by the Air Force; Contract No. HDTRA-007-0026 awarded by the Defense Treat Reduction Agency; and Contract No. RHS-UD-08-02, awarded by the Dayton Area Graduate Studies Institute. The government has certain rights in the invention.

BACKGROUND

Various embodiments of the invention relate to the synthesis of stabilized aluminum nanoparticles, and more particularly, to a method of producing hydrogen from the reaction of stabilized aluminum nanoparticles with water.

The desire for the development of technologies which utilize hydrogen gas for power generation has increased in recent years. However, the use of hydrogen for such applications requires readily available, safe, and environmentally friendly access to hydrogen.

It is known that the reaction of aluminum with water yields hydrogen gas:

$$2Al + 6H_2O \rightarrow 2Al(OH)_3 + 3H_2 \quad (1)$$

$$2Al + 4H_2O \rightarrow 2ALO(OH) + 3H_2 \quad (2)$$

$$2Al + 3H_2O \rightarrow Al_2O_3 + 3H_2 \quad (3)$$

However, these reactions are limited due to the natural occurrence of a protective aluminum oxide shell on the surface of the aluminum. The stability of aluminum oxide prevents air and moisture from accessing the underlying aluminum metal.

To address these problems and facilitate the generation of hydrogen, various attempts have been made to alter the reaction, such as the addition of strong bases, the application of high temperatures, or activation of the aluminum metal. For example, it has been found that by dissolving aluminum in liquid gallium, the formation of the aluminum oxide shell is prevented, thus allowing the aluminum-water reaction to proceed. However, the procedure for such a reaction is complex.

SUMMARY OF THE INVENTION

It is against the above background that embodiments of the invention alter the nature of the protective aluminum oxide shell in a manner which allows the aluminum-water reaction to proceed easily and safely to generate large quantities of hydrogen.

Embodiments of the invention provide a method of synthesizing aluminum nanoparticles which are stable in air and solvents, but which are reactive with water and can be used to generate hydrogen. The stabilized aluminum nanoparticles are formed by decomposition of an alane precursor in the presence of a catalyst and an organic passivation agent such that the formed nanoparticles have an organic outer shell and an organic-provided oxide inner shell. The reaction of the stabilized aluminum nanoparticles with water is spontaneous and requires no promoters or energy to initiate the reaction, and the hydrogen gas generated from the reaction may be used in power applications such as in fuel cells and internal combustion engines, and in propulsion applications such as gas turbine engines.

In a preferred embodiment of the invention, a method of generating hydrogen gas is provided which comprises providing stabilized aluminum nanoparticles which have been formed by the decomposition of an alane precursor in the presence of a catalyst and an organic or organometallic passivating agent, and reacting the stabilized nanoparticles with water; where the reaction provides at least an 85% hydrogen yield. More preferably, the reaction results in at least a 95% hydrogen yield.

By "stabilized," it is meant that the nanoparticles do not react in air or upon exposure to solvents such as nonpolar hydrocarbons including hexane and toluene, heteroatom and halogenated hydrocarbons such as tetrahydrofuran and chloroform, and polar solvents such as ethanol and methanol, but that the nanoparticles will readily react with water to form hydrogen.

The stabilized aluminum nanoparticles used in the reaction preferably have a size ranging from about 2 nm to about 100 nm in one embodiment, and more preferably, from about 20 to about 65 nm in another embodiment. In one embodiment, the ratio of aluminum nanoparticles to water by mass is about 0.04 to about 1.0.

In one embodiment, the alane precursor is selected from dimethylethylamine alane and 1-methylpyrrolidone alane and the catalyst preferably comprises titanium (iv) isopropoxide. In one embodiment, the passivation agent is selected from the group consisting of carboxylic acids, amines, alcohols, thiols, acyl halides, ketones, aldehydes, carbonates, esters, epoxides, organic metals, or combinations thereof.

In one preferred embodiment, the aluminum nanoparticles are formed by combining an alane precursor, a catalyst; and an organic passivating agent in solution; and sonicating the solution. In this embodiment, the alane precursor preferably comprises alane N,N-dimethylethylamine, the catalyst preferably comprises titanium (IV) isopropoxide, and the passivation agent is selected from the group consisting of carboxylic acids, amines, and alcohols. In a preferred embodiment, the passivation agent comprises oleic acid. In this embodiment, the formed nanoparticles have a size ranging from about 5 to about 70 nm, and an average size of about 30 nm. The aluminum nanoparticles formed by this method comprise about 35% of an organic shell layer (by mass).

The resulting stabilized aluminum nanoparticles are capable of reacting with water and can be used to generate large amounts of hydrogen in an easy and environmentally friendly process for use in power generation.

Accordingly, the various embodiments of the invention provide a method of generating hydrogen gas from the reaction of stabilized aluminum nanoparticles with water and a method of synthesizing stabilized aluminum nanoparticles having water reactivity. Other features and advantages of the various embodiments of the invention will be apparent from the following description and the accompanying drawings.

DETAILED DESCRIPTION OF THE PREFERRED EMBODIMENTS

Figure 1:
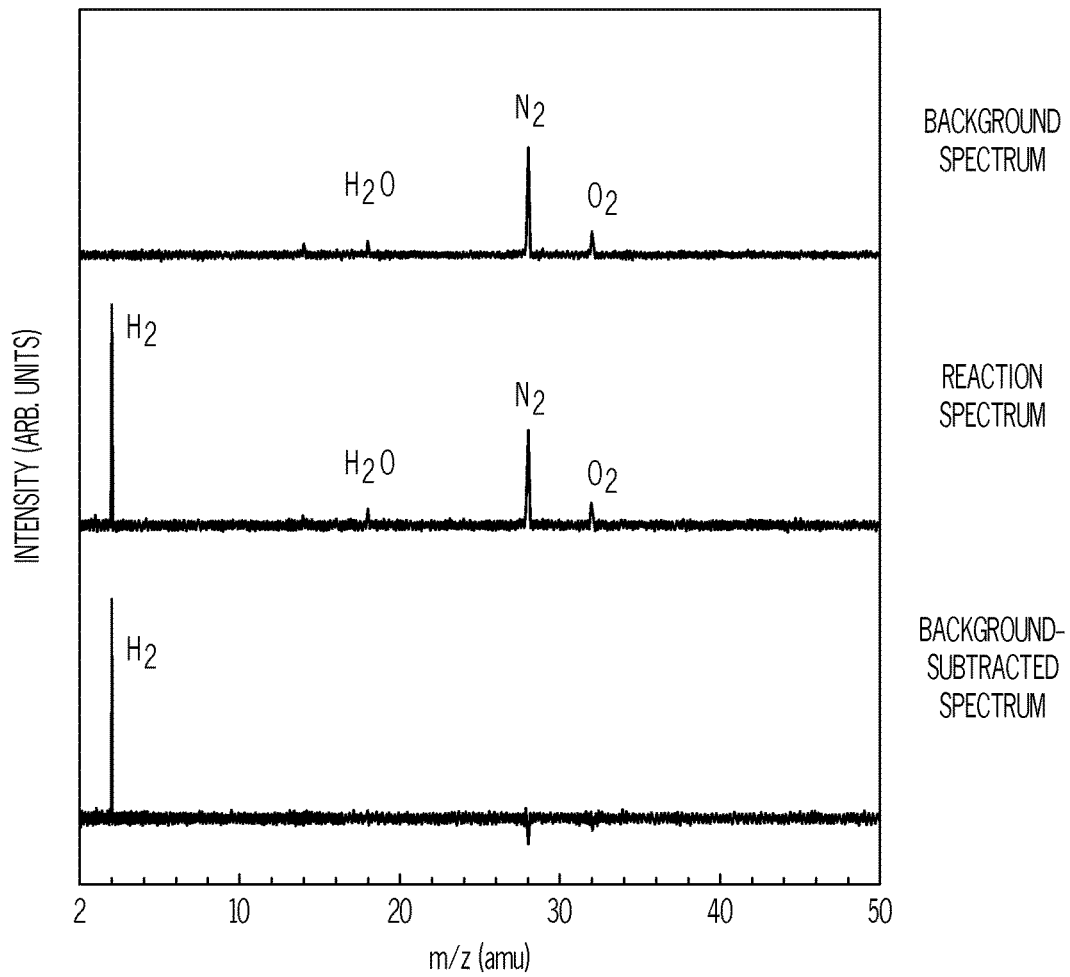
FIG. 1 is a mass spectra illustrating hydrogen produced from the reaction of aluminum-oleic acid nanoparticles and water.

The reaction of stabilized aluminum nanoparticles with water to yield hydrogen gas can be performed in a simple manner, requiring no promoters or initial energy to initiate the reaction. This reaction is achieved by the synthesis of aluminum nanoparticles having stability in air and organic solvents but which readily react with water. Nanoscale aluminum is preferred for use in the reaction as aluminum nanoparticles demonstrate enhanced reactivity, i.e., they oxidize more quickly and fully than micrometer-sized or bulk-sized aluminum due to their large specific surface area and energy density. However, commercial aluminum nanoparticles having an aluminum oxide shell do not readily react with water under ambient conditions (room temperature and standard pressure). The inventors have discovered that by chemically modifying the aluminum oxide shell of nanoparticles during synthesis to provide an organic shell, the nanoparticles can be reacted with water at room temperature to generate hydrogen.

The reaction of the aluminum nanoparticles with water is a near complete reaction, and the rate of hydrogen production can be varied by controlling the nanoparticle-to-water mass ratio. The hydrogen generated by this reaction is sufficient to provide power without requiring the direct storage of large quantities of hydrogen. Thus, hydrogen can be generated with the addition of water where and when needed.

A number of methods may be used for producing stabilized aluminum nanoparticles for reactivity with water. The synthesis of stabilized aluminum nanoparticles generally involves the thermal decomposition of an alane precursor in the presence of a titanium catalyst and an organic passivation agent. The preferred catalyst is titanium (IV) isopropoxide.

Generally, any alane or alane complex is suitable for use in the method. Preferred alanes for use include dimethylethylamine alane, $H_3AlN[(CH_3)_2C_2H_5]$ and 1-methylpyrrolidine alane, $H_3AlN[(C_4H_8)(CH_3)]$.

Suitable organic or organometallic passivation agents include carboxylic acids, amines, alcohols, thiols, acyl halides, ketones, aldehydes, carbonates, esters, epoxides and organic metals. Examples of specific passivation agents include oleic acid, 2-hexadecanone, 1-octanol, Span 80, dodecyl aldehyde, 1,2-epoxydodecane, arachidyl dodecanoate, octadecylamine, chloro(dimethyl)octdecylsilane, and nickel stearate. The organic passivation agent functions to cap the growing nanoparticle surface to stop particle growth, keeping the aluminum particles to a nanoscale size during their formation and during alane decomposition and also protects the formed nanoparticles from oxidizing at the surface. While not wishing to be bound by theory, it is believed that the organic passivation agent used to form the nanoparticles provides an organic oxide layer or core shell on the nanoparticle which provides the desired particle stability, i.e., stability in air and solvents but reactivity with water.

It should be appreciated that the concentration of the passivation agent affects the aluminum nanoparticle core size; i.e., a higher concentration of passivation agent results in a smaller nanoparticle size, while a lower concentration results in a larger particle size. For example, when a high concentration of passivation agent is used, the particle size is about 5 nm. This effect is caused by the balance between the number of molecules available to cap a growing nanoparticle surface and the amount of surface area of the growing nanoparticle. As a nanoparticle grows larger, the surface area decreases. This growth occurs until the amount of passivation agent is sufficient to cap that surface. Less passivation agent will cover less surface area, thus the particles will grow larger before they are capped.

A preferred method of synthesizing aluminum nanoparticles for reaction with water to generate hydrogen is the sonochemically-assisted thermal decomposition of alane. In one preferred method, N,N-dimethylethylamine alane is combined with a titanium isopropoxide catalyst and an organic passivation agent comprising oleic acid. The synthesis is described in more detail in K. A. Fernando et al., "Sonochemically Assisted Thermal Decomposition of Alane N,N-Dimethylethylamine with Titanium (IV) Isopropoxide in the Presence of Oleic Acid to Yield Air-Stable and Size-Selective Aluminum Core-Shell Nanoparticles," *J. Phys. Chem. C.*, Vol. 113, No. 2, 2009, pp. 500-503, the disclosure of which is incorporated herein by reference. A solution of oleic acid is prepared with a solvent such as dodecane and combined with the alane and titanium (iv) isopropoxide catalyst. The resulting solution is then sonicated for about 7.5 minutes at an amplitude of about 37%, (i.e., the percentage of the sonicator head's incursion into the solution) and a power use of about 22 W to produce a solution that gradually precipitates and yields a powder which can be recovered by evaporation of the solvent under vacuum.

The aluminum oleic-acid nanoparticles formed from this process have a face-centered cubic crystal (fcc) structure comprising an inner aluminum core surrounded by an oxide shell and an outer organic shell. The structure comprises about 40% aluminum core, about 35% organic shell (oleic acid), and about 25% inner oxide shell by mass based on the total particle mass. The nanoparticles range in size from about 2 nm to about 100 nm, and have an average size of about 30 nm. However, it should be appreciated that larger size nanoparticles (greater than 100 nm) may also be used.

It should also be noted that while oleic acid is a preferred capping agent for the sonochemical thermal decomposition method, other organic capping agents may be used, including 2-hexadecanone, 1-octanol, Span 80, dodecyl aldehyde, 1,2-epoxydodecane, arachidyl dodecanoate, octadecylamine, chloro(dimethyl)octadecylsilane, and nickel stearate.

In studying the nature of the metal-organic bonding in the formed aluminum-oleic acid core-shell nanoparticles, the inventors have found that the organic layer on the nanoparticles appears to be attached via Al—O—C bonds with the C atom formerly involved in the carboxylic acid functional group. IR spectra of the nanoparticles indicates that C—H and O—H groups are present but that carbonyl and carboxylate signals are substantially absent. In addition, X-ray photoelectron spectroscopy (XPS) testing has confirmed the presence Al—O and/or Al—O—C bonds, but shows no Al—C bonds. Thus, it is believed that the oleic acid passivation agent is bound neither as a carboxylate nor via Al—C bonds resulting from decomposed carboxylates, but rather appears to be attached via Al—O—C bonds with the C atom formerly involved in the carboxylic acid functional group. See Lewis et al. "Multispectroscopic (FTIR, XPS, and TOFMS-TPD) Investigation of the Core-Shell Bonding in Sonochemically Prepared Aluminum Nanoparticles Capped with Oleic Acid," *J. Phys. Chem.*, vol. 114, no. 14, 6377-6380, 2010, the disclosure of which is incorporated herein by reference.

The oxide shell of the aluminum nanoparticle is believed to be formed from oxygen atoms brought to the aluminum surface by the oleic acid passivation agent, i.e., as the passivation agent attaches to the aluminum nanoparticle surface as part of the particle growth process, the oxygen from the carboxylic acid functional group (RCOO—) bonds to the aluminum surface, thus providing the oxygen needed to form the protective oxide shell. It is also believed that the oleic acid decomposes as it reacts to passivate the aluminum nanoparticle surface, i.e., bonds are broken with the carboxylic acid functional group; thus, the oleic acid molecule is no longer technically oleic acid but is now essentially part of the nanoparticle molecule.

Thermal analysis of stabilized aluminum nanoparticles produced by the sonochemical method has shown that the oxide shell does not behave in the same way as the oxide shell of natural aluminum oxide nanoparticles, reacting at much lower temperatures (about 150 to 400° C.) in comparison will standard aluminum nanoparticles, which react/oxidize at elevated temperatures of about 500° C. to 600° C. Further, it is noted that nanoparticles prepared by conventional thermal decomposition of alane do not exhibit the stability achieved using sonochemistry, i.e., they oxidize within minutes to days. In contrast, the oxide shell of the aluminum-oleic acid nanoparticles formed by the sonochemical thermal decomposition method is believed to prevent oxidation of the aluminum metal under ambient conditions, i.e., it does not readily react with air or moisture in the air. The inventors have found that samples stored in glass bottles on a countertop remained viable after several months of storage with no special precautions.

While not wishing to be bound by theory, it is believed that there are unique aspects of the sonochemical process which influence the properties of the nanoparticles; for example, sonochemistry generates extreme temperature regions (micron sized bubbles) in the reaction solution that can reach temperatures as high as 5,000 K with very rapid cooling rates (about $10^{10}$ K/sec), which then promotes radical formation, and displays the phenomenon of jetting (harsh impacting of material on the micron scale).

The subsequent reaction of the formed aluminum-oleic acid nanoparticles with water at room temperature is nearly complete, with hydrogen gas yields of 85% to 95% of the theoretical yield. This reaction is shown below and corresponds to earlier Equation (2):

$$2Al + 4H_2O \rightarrow 2AlO(OH) + 3H_2 \qquad (2)$$

where AlO(OH) is boehmite and where 2 moles of aluminum are expected to yield 3 moles of molecular hydrogen gas. The boehmite byproduct can be recycled or discarded. The rate of hydrogen production may be controlled by adjusting the amount of water.

In a typical reaction which corresponds to equation (2) above, about 1 gram of aluminum-oleic acid nanoparticle material is placed within a 25 mL stainless-steel pressure vessel, and about 2 mL of room temperature tap water is added. The vessel is immediately sealed. The pressure typically reaches about 400 psi in less than about 30 seconds, and the temperature of the vessel reaches about 130° C. in about the same time. Thus, the reaction is rapid and may be completed within several minutes. One (1) gram of aluminum-oleic acid nanoparticles (AlOA) produces approximately 0.5 L of hydrogen gas.

The nanoparticle-water reaction is highly exothermic due to high heat of reaction of aluminum metal with water, resulting in significant local heating. The exothermic properties and self-heating nature of the reaction allow the rate of the reaction to be controlled through manipulation of the system temperature. While the reaction may be initiated at room temperature and standard pressure, the use of higher temperatures will make the reaction proceed faster, while lower temperatures will slow the reaction. For example, if active cooling is applied, the hydrogen may be able to be slowly delivered as it is produced, negating the need for a high pressure vessel and improving the safety of the system.

The reaction is strongly influenced by the mass ratio of aluminum nanoparticles to water, which may vary from 0.04 to 1.0. The inventors have found that the rate of hydrogen production can be controlled by controlling this nanoparticle-to-water mass ratio. A desired rate of hydrogen production is between about $6.4 \times 10^{-4}$ and 0.01 g of $H_2$/s/g of aluminum. See Bunker et al., "Spontaneous Hydrogen Generation from Organic-Capped Al Nanoparticles and Water," *Applied Materials & Interfaces*, Vol. 2, No. 1, 11-14, 2010, the disclosure of which is incorporated herein by reference.

While the sonochemical method of synthesizing aluminum nanoparticles has been primarily described herein, it should be appreciated that other methods may be used to produce stable aluminum nanoparticles which are reactive with water to produce hydrogen.

One suitable method is a wet chemical synthesis of aluminum nanoparticles utilizing alane precursors including dimethylethylamine alane and 1-methylpyrrolidone alane. The passivation agents may comprise $C_{13}F_{27}COOH$, 1H,1H-perfluoro-1-tetradecanol ($C_{13}F_{27}CH_2OH$), tetradecanoic acid ($C_{13}H_{27}COOH$), HDIPA, and octadecylamine, or combinations thereof. This method of synthesis is described in Meziani et al., "Formation and Properties of Stabilized Aluminum Nanoparticles," *Applied Materials & Interfaces*, Vol. 1, No. 3, 703-709, 2009, the disclosure of which is incorporated herein by reference. The method includes combining the alane precursors in solution, adding a titanium isopropoxide catalyst, and adding the passivation agent(s), followed by removal of residual solvent.

In another embodiment, the aluminum nanoparticles are formed in a polymerization encapsulation method by combining an alane precursor, a catalyst; and a passivating agent comprising an epoxide selected from epoxyhexane and epoxydodecane. In this method, a solution of N,N-dimethylethylamine alane in toluene is combined with a titanium isopropoxide solution and a stoichiometric amount of epoxide is added as the passivation agent. The reaction is stirred for about 30 minutes followed by removal of the solvent. The epoxides polymerize on the nanoparticle to produce a polyether such that the aluminum nanoparticle core is surrounded by a protective oxygen-rich polyether cap. See Chung et al., "Capping and Passivation of Aluminum Nanoparticles Using Alkyl-substituted Epoxides," *Langmuir* 2009, 25 (16), 8883-8887, the disclosure of which is incorporated herein by reference. In this method, the stabilized aluminum nanoparticles have a size of from about 20 to about 30 nm.

The inventors have also found that the use of organometallic passivation agents such as silicon and nickel are effective in forming stabilized nanoparticles capable of reacting with water using the sonochemical thermal decomposition method. The use of aluminum silicon core-shell nanoparticles is preferred as they provide the highest aluminum content and hydrogen yield.

Table 1 below illustrates a number of capping/passivation agents which can be used to synthesize aluminum nanoparticles using the sonochemical thermal decomposition method, along with the resulting nanoparticle size, shell content, and aluminum content.

TABLE 1

Al-CAPPING AGENT Core-Shell Nanoparticles and Properties

| Capping Agent | Functional group | [a]NP Size | [b]Shell content | [c]Al content |
|---|---|---|---|---|
| Oleic Acid | carboxylic acid | 60 nm | 35% | 40% |
| 2-Hexadecanone | ketone | 45 nm | 24% | 43% |
| 1-octanol | alcohol | 50 nm | 30% | 42% |
| Span 80 | multi | 45 nm | 50% | 37% |
| dodecyl aldehyde | aldehyde | 40 nm | 21% | 34% |
| 1,2-epoxydodecane | epoxide | 20 nm | 33% | 25% |
| arachidyl dodecanoate | ester | 45 nm | 45% | 20% |
| octadecylamine | amine | 30 nm | 25% | 18% |
| chloro(dimethyl)octedecylsilane | silane | 50 nm | 31% | 50% |
| nickel stearate | nickel/carboxylate | 65 nm | 38% | 20% |

Figure 6:
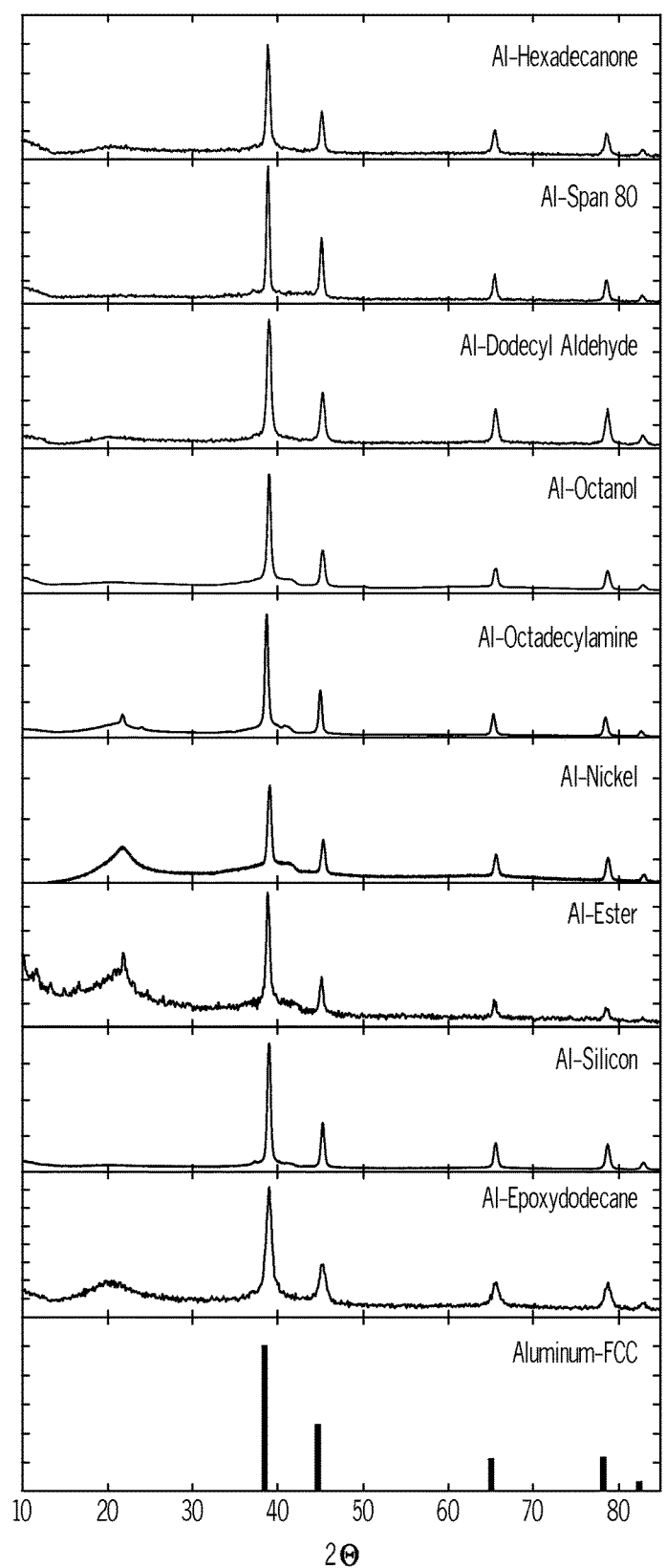
FIG. 6 is a series of X-ray diffraction spectra for various aluminum organic core-shell nanoparticles in comparison with the XRD diffraction pattern for aluminum.

[a]nanoparticle size estimated from XRD analysis
[b]shell content determined from TGA analysis
[c]Al content determined from quantitative hydrogen yield using AlOA as standard, AlOA determined from ICP-MS analysis FIG. 6 illustrates X-ray diffraction (XRD) spectra of various aluminum organic core-shell nanoparticles formed using the above passivation agents in comparison with the XRD diffraction pattern for face-centered cubic aluminum. As can be seen, the peaks for the nanoparticles correspond to the peaks for aluminum, confirming the ability to form aluminum nanoparticles with an aluminum core.

In yet another embodiment, the stabilized aluminum nanoparticles are formed by a polymer impregnation and encapsulation method in which an alane precursor is combined with a polymer membrane in solution. The polymer membrane preferably comprises a perfluorinated ion-exchange membrane. In this embodiment, the resulting stabilized nanoparticles have a size of from about 10 to about 15 nm. In the method, a 1-methylpyrrolidine alane precursor is provided in solution and combined with a polymer membrane comprising Nafion-117 membrane film (commercially available under the designation DuPont™ Nafion®) which has been soaked in an isopropanol solution. See Li et al., "Templated Synthesis of Aluminum Nanoparticles—A New Route to Stable Energetic Materials," *J. Phys. Chem. C*, Vol. 113, No. 48, 2009, the disclosure of which is incorporated herein by reference. The nanoparticles become embedded in the membrane structure, which protects the Al nanoparticles from significant oxidation, making them stable in ambient air.

It should be appreciated that any method of synthesizing the aluminum nanoparticles may be used as long as the resulting nanoparticles demonstrate the required air and solvent stability and reactivity with water to produce hydrogen. In addition to the methods described above, laser ablation, evaporation/condensation, and sono-electrochemical methods may be used to form the aluminum nanoparticles. See, for example, Eliezer et al., Synthesis of nanoparticles with femtosecond laser pulses, *Physical Review B* 69, 144119 (2004), Normatov et al., Preparation of Benzene-Stabilized Aluminum Nanoparticles in Hydrogen Atmosphere, *Inorganic Materials* Vol. 37, No. 10, 2001, pp. 1002-1005, and Mahendiran et al., "Sonoelectrochemical Synthesis of Metallic Aluminum Nanoparticles, *Eur. J. Inorg. Chem.* 2009, 2050-2053.

In order that the invention may be more readily understood, reference is made to the following examples which are intended to illustrate the invention, but not limit the scope thereof.

EXAMPLE 1

Aluminum nanoparticles (aluminum-oleic acid core-shell nanoparticles) were formed in accordance with the invention by sonochemically-assisted thermal decomposition of alane. The materials used included alane N,N-dimethylethylamine in a 0.4 M toluene solution, titanium (IV) isopropoxide (98%), oleic acid (99%), and dodecane (99% anhydrous), all obtained from Aldrich Chemicals. Hexane (Optima grade) was obtained from Fisher Scientific.

4 mL of a deoxygenated solution of oleic acid in dodecane (0.058 M) was combined with 10 mL of a solution of alane N,N-dimethylethylamine in toluene (0.5 M), making a 14 mL working solution with an oleic acid concentration of 0.017 M and an alane concentration of 0.36 M. To this combined solution was added 15.5 µL of titanium (IV) isopropoxide, resulting in a concentration of $3.7 \times 10^{-3}$ M. The working solution was then sonicated for 7.5 minutes active time at an amplitude of about 37% and a power use of about 22 W following a one-second-on, one-second-off procedure (duty cycle about 46%). These conditions produced a black colored solution that gradually precipitated, yielding a grayish-black powder. The powder was recovered by evaporation of the solvent under vacuum followed by repeated washings with hexane. The reaction yielded between 200 and 250 mg aluminum nanoparticles per synthesis.

EXAMPLE 2

Figure 7:
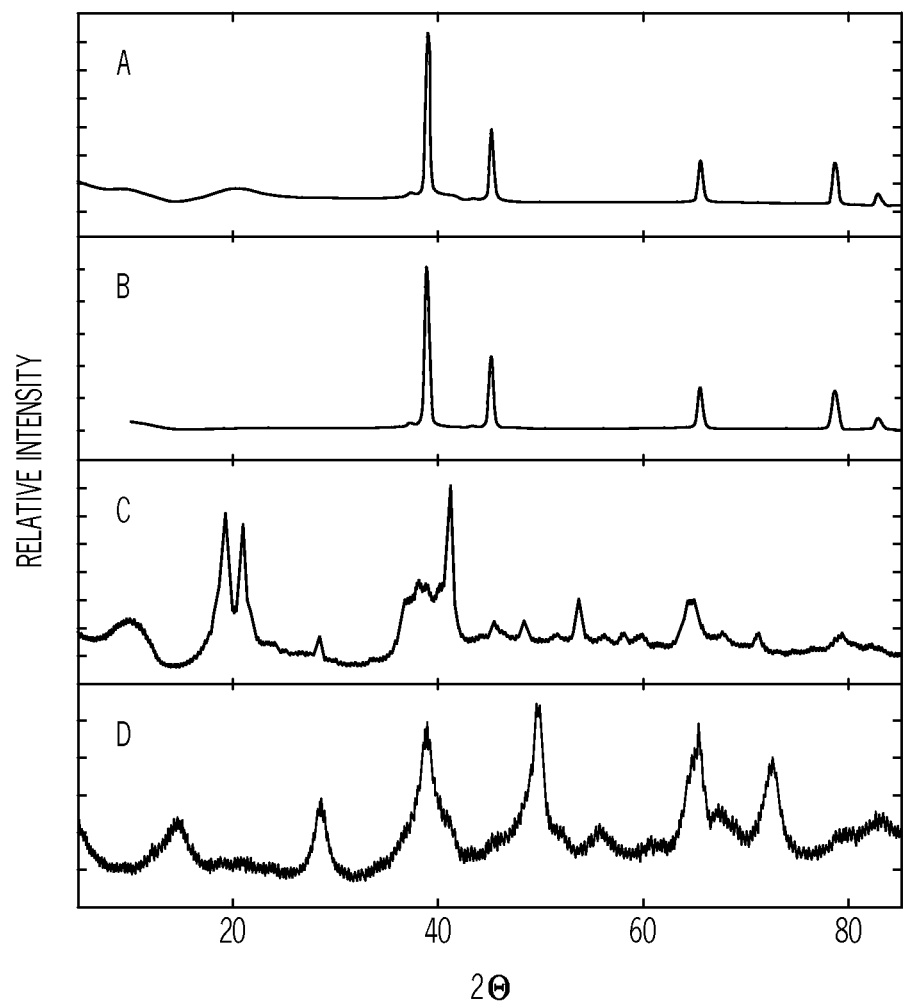
FIG. 7 illustrates X-ray diffraction spectra of aluminum-oleic acid nanoparticles before and after exposure to various solvents.

To demonstrate the stability of aluminum-oleic acid nanoparticles formed in accordance with Example 1, aliquots of about 20 mg of aluminum nanoparticle samples were suspended in a series of solvents (5 mL) and agitated in a simple sonic bath for 90 minutes. The solvents included hexane, toluene, tetrahydrofuran (THW), chloroform, ethanol, methanol, and water. In all cases but one (water), the particles remained unchanged as measured by powder x-ray diffraction. Only water showed a change in the particles, evidenced by a significantly altered x-ray spectrum as shown in FIG. 7. Also as shown, (A) represents the spectra for the as-synthesized aluminum oleic acid nanoparticles, (B) represents the nanoparticles after exposure to methanol and is representative of exposure to hexane, toluene, THF, chloroform, and ethanol, (C) represents the product of the reaction of the aluminum nanoparticles with water at an AlOA:$H_2O$ ratio of $10^{-3}$; and (D) represents the product of the reaction of the aluminum nanoparticles with water at an AlOA:$H_2O$ ratio of 0.5.

EXAMPLE 3

Figure 2:
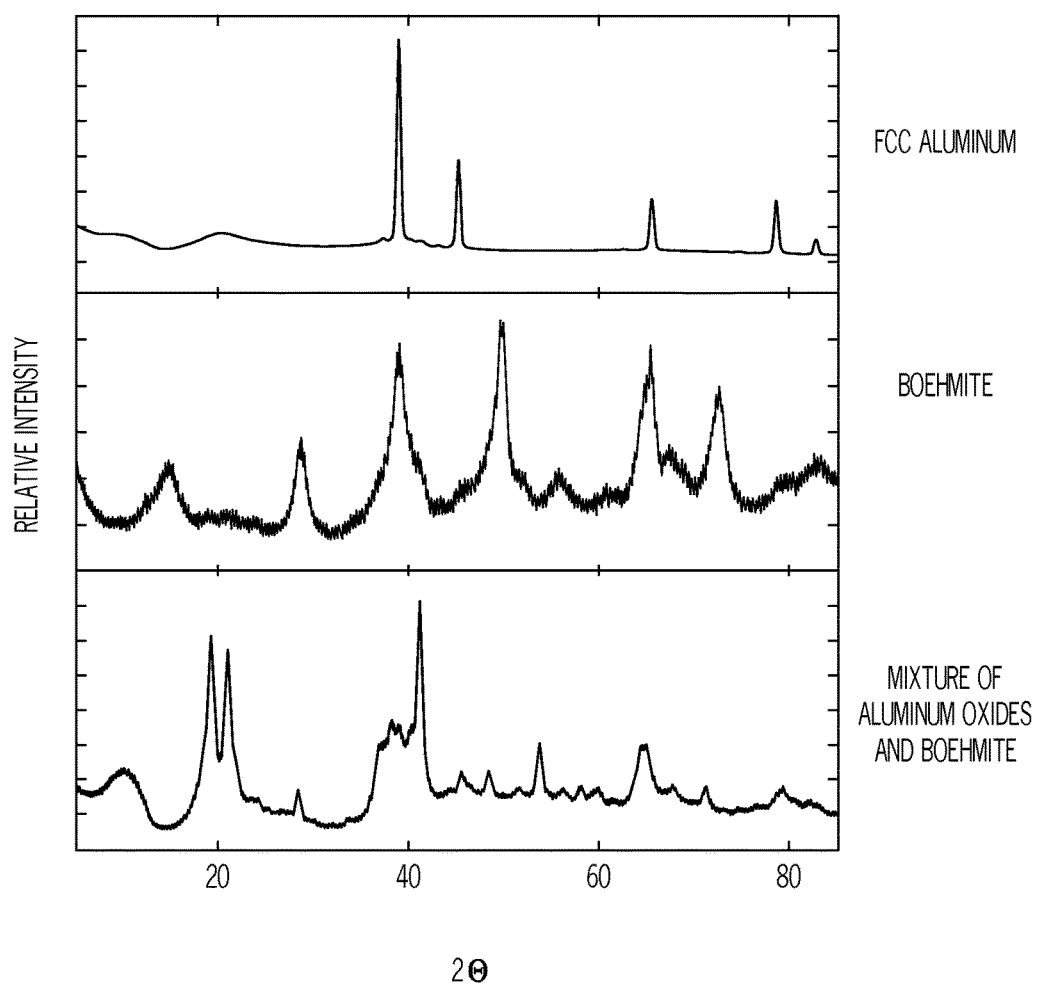
FIG. 2 is x-ray diffraction spectra for the aluminum-oleic acid nanoparticles and the product of the reaction of the nanoparticles with water in a reaction with small quantities of water and in a reaction with large quantities of water.

To test the reaction of aluminum-oleic acid nanoparticles with water, a small quantity of nanoparticle sample (20 mg) obtained from Example 1 was mixed with water (5 mL) and the headspace sampled with a home-assembled quadrupole mass spectrometer. After subtraction of a background spectrum, the data showed a strong signal for hydrogen gas as shown in FIG. 1. It should be noted in that in these experiments, the aluminum-oleic acid nanoparticle (AlOA) to water mass ratio was fairly small (AlOA:$H_2O=10^{-3}$). When performed at a much larger ratio (e.g., 0.5), the reaction appeared far more vigorous and generated considerable heat. The x-ray spectrum of oxide product formed under those conditions demonstrated a clear pattern for boehmite (AlOOH) as shown in FIG. 2 top identified as face-centered cubic aluminum, middle identified as boehmite (product of the reaction of the nanoparticles with water in a reaction with small quantity of water) and bottom identified as a mixture of aluminum oxides with boehmite (reaction with large quantity of water)

Figure 3:
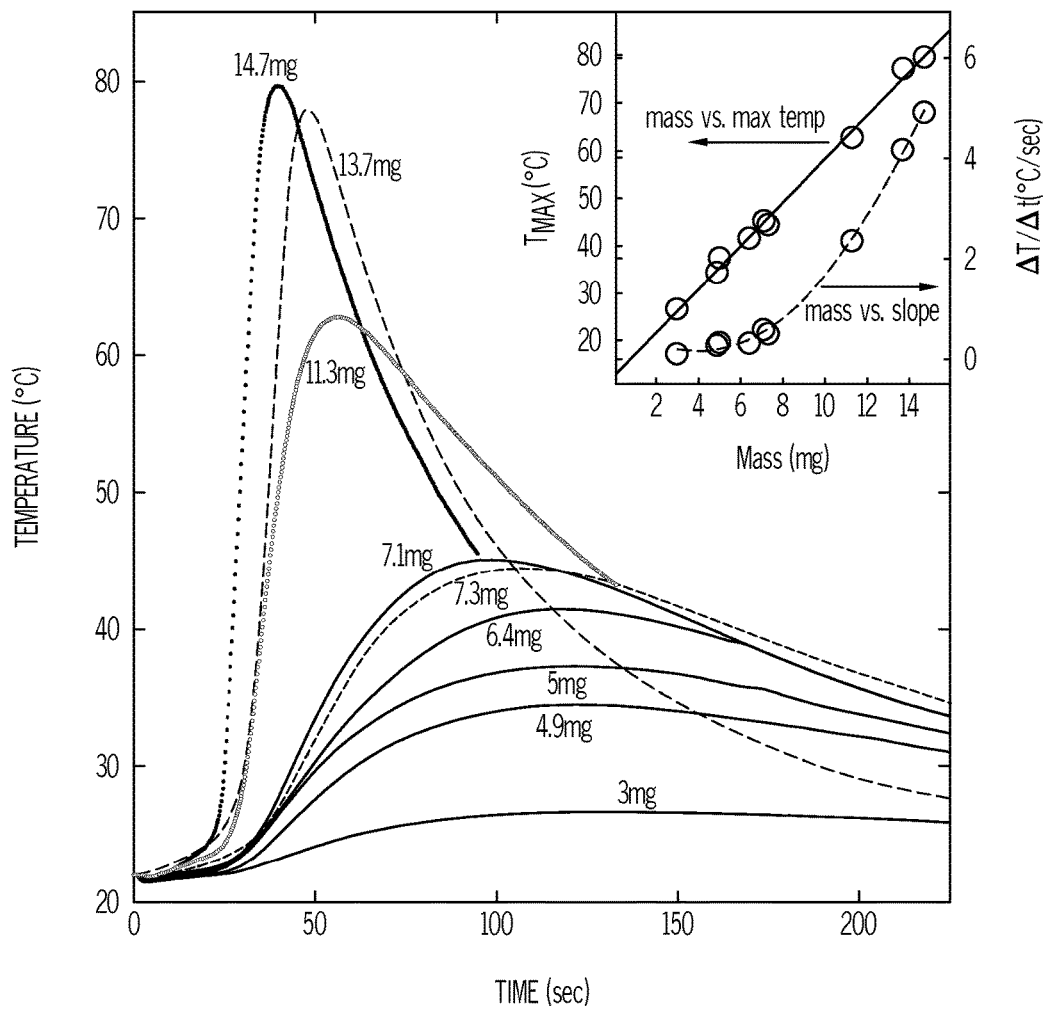
FIG. 3 is a graph plotting the temperature vs. time for the reaction of the aluminum-oleic acid nanoparticles with water.
Figure 4:
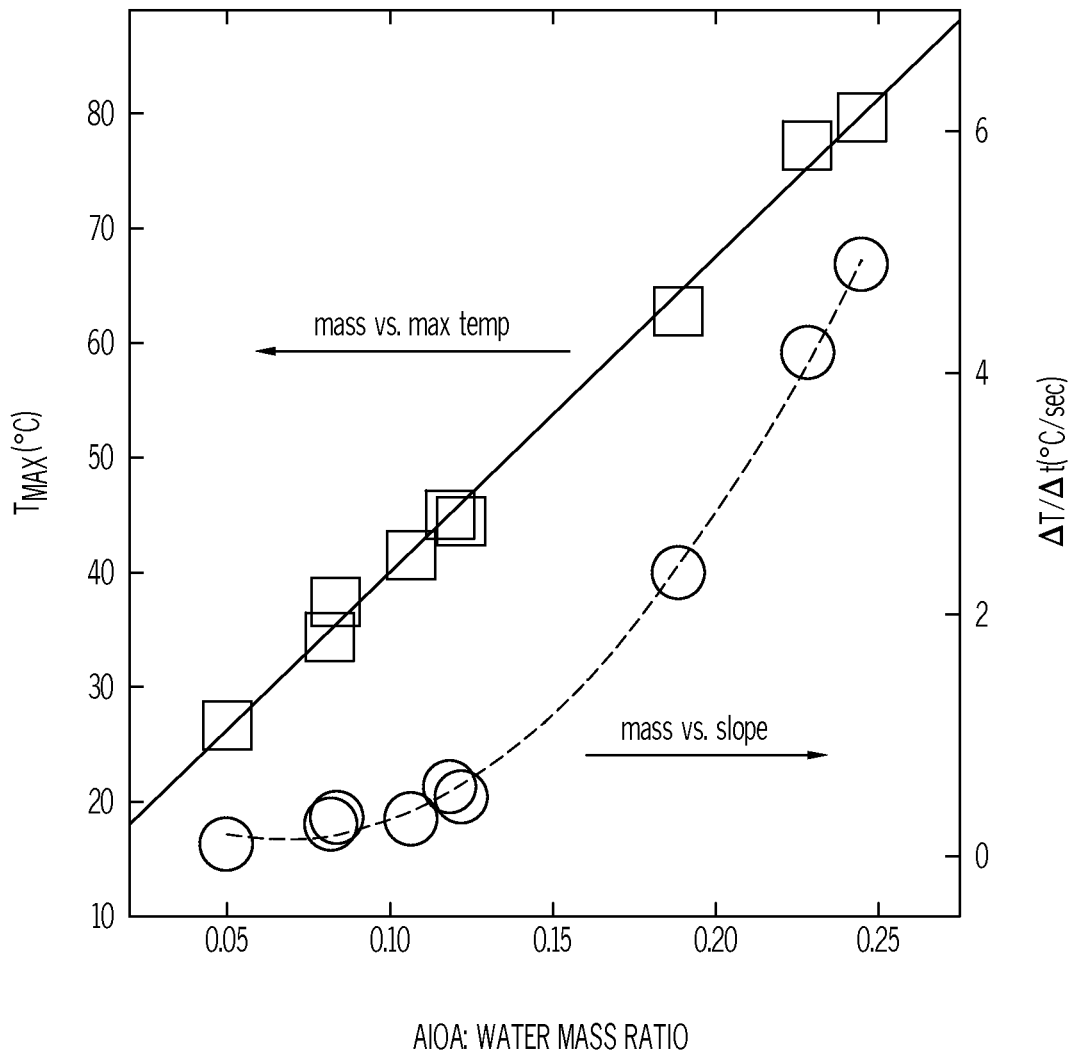
FIG. 4 is a graph depicting the maximum temperature vs. mass ratio of AlOA:water.

To further investigate these observations, a small-scale temperature measurement system was assembled using a thermocouple affixed to an aluminum cup. Water (a constant 60 μL) was added to AlOA samples varying in mass from about 2 mg to 15 mg (AlOA:$H_2O=0.03$ to 0.25). Temperature was recorded as a function of time, and the data was plotted as shown in FIG. 3. The traces of temperature vs. time were all similar in that they exhibited an induction phase, a rapid rise, a maximum, and then a steady decrease, eventually returning to room temperature. A plot of the slopes obtained from the rapid rise section of each trace vs. sample mass is also shown in FIG. 3. The data indicate that as mass increases, the rate at which the sample reaches its maximum temperature increases non-linearly. This observation is indicative of a self-heating reaction; as the sample reacts, the heat generated accelerates the reaction. This effect is amplified as the sample mass increases. Also as shown in FIG. 3 are the values for maximum temperature vs. sample mass. The plot is linear, indicating that the reaction yield is constant. FIG. 4 further illustrates the maximum temperature vs. AlOA:water mass ratio and the change in temperature per change in time for the rapid rise section of the curves vs. mass ratio.

Figure 5:
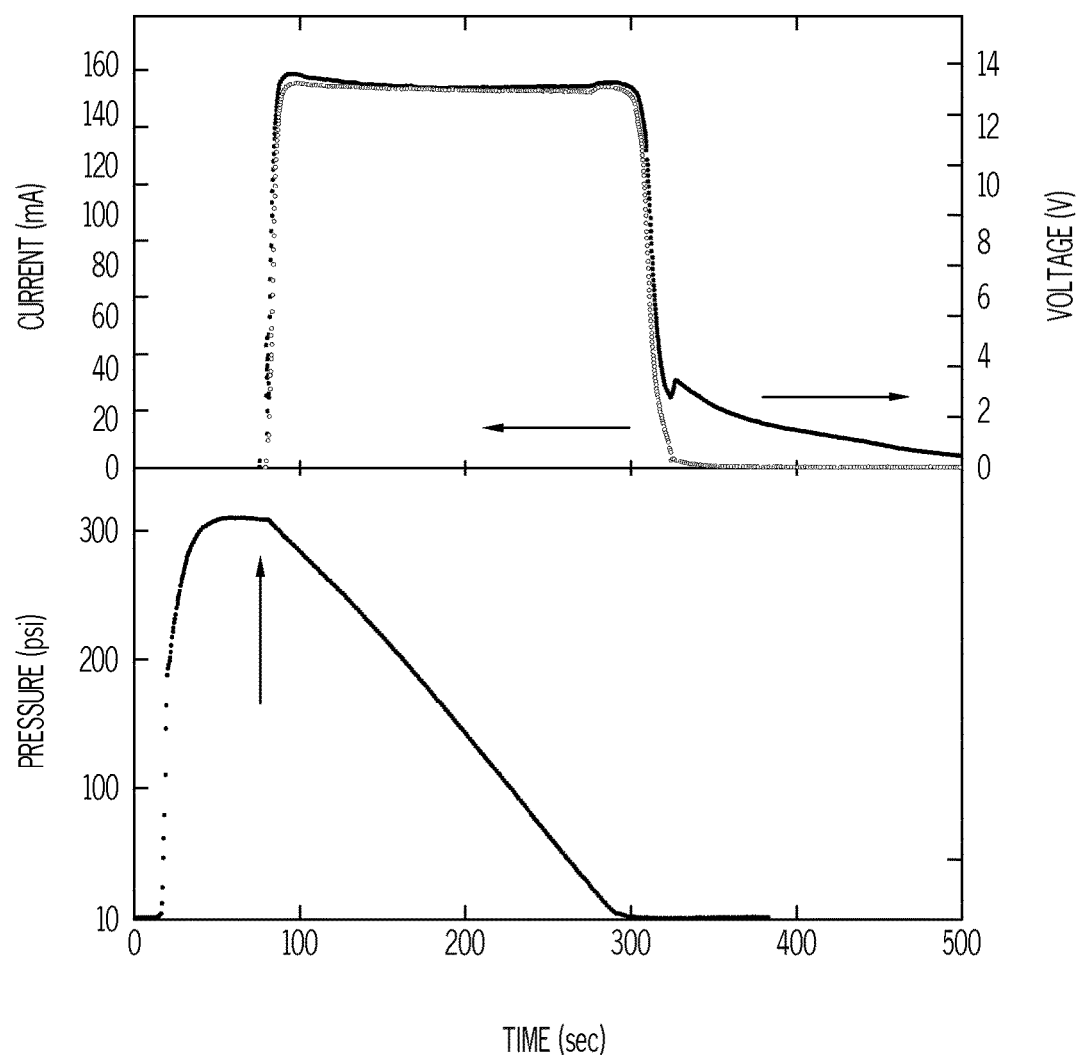
FIG. 5 is a graph illustrating pressure vs. time for the reaction of aluminum-oleic acid nanoparticles with water and voltage and current vs. time for the operation of a fuel cell using the hydrogen produced from the reaction of aluminum-oleic acid nanoparticles with water.

To obtain a value for the yield, the same basic experiment was performed using a 25 mL pressure vessel coupled to a digital pressure meter. 1 g of sample and 2 mL of water were added to the vessel (AlOA:$H_2O=0.05$), resulting in a rapid increase in pressure due to hydrogen gas generation. The pressure was plotted vs. time as shown in FIG. 5 and shows a rapid rise that then slowed to reach a plateau. The pressure at the plateau was 309 psi, or 21 atm. Based on the composition of the samples (about 40% aluminum metal), using the stoichiometry of $2Al+4H_2O \rightarrow 2Al(OH)+3H_2$, and applying the ideal gas law, an approximate 95% yield was calculated for the formation of hydrogen gas. The rate at which hydrogen was generated under the continuous reaction conditions was about 0.01 g of $H_2$/s/g of aluminum.

The utility of the hydrogen generated is shown in FIG. 5 where just after the plateau was reached, the pressure vessel was placed in-line with a fuel cell equipped with a pressure regulator set to deliver less than about 5 psi hydrogen. A simple computer fan was attached to the fuel cell to serve as the electrical load, and the voltage and current were recorded as the hydrogen was consumed. Once the hydrogen was delivered to the cell, the voltage and current quickly reached stable working values (about 13 V and 0.15 A). The power consumed by this system is about 2 W for a continuous 2.3 minutes.

Thus, with the method described herein, hydrogen can be used as a viable fuel in a number of energy conversion devices. When hydrogen is coupled with a fuel cell, it may be used to power communications equipment such as radios and cell phones, computers, and lighting. Other potential applications include remote sensors, vehicles, and combustion applications such as micro turbines and thermoelectric engines. The method provides an advantage in that aluminum and water can be stored to generate hydrogen where and when needed, without the need for storing and/or transporting large quantities of gaseous or liquid hydrogen, which can be dangerous.

Having described the invention in detail and by reference to preferred embodiments thereof, it will be apparent that modifications and variations are possible without departing from the scope of the invention.

The invention claimed is:

1. A method of generating hydrogen gas comprising:
providing stabilized aluminum nanoparticles formed by decomposing an alane precursor in the presence of a catalyst and an organic or organometallic passivating agent; and
reacting the nanoparticles with water; wherein the reaction provides a hydrogen yield of at least 85%.

2. The method of claim 1, wherein the hydrogen yield is at least 95%.

3. The method of claim 1, wherein the nanoparticles have a particle size from about 5 nm to about 70 nm.

4. The method of claim 1, wherein the ratio of aluminum nanoparticles to water by mass is about 0.04 to about 1.0.

5. The method of claim 1, wherein the alane precursor is selected from dimethylethylamine alane and 1-methylpyrrolidone alane.

6. The method of claim 1, wherein the catalyst comprises titanium (iv) isopropoxide.

7. The method of claim 1, wherein the passivation agent is selected from the group consisting of carboxylic acids, amines, alcohols, thiols, acyl halides, ketones, aldehydes, carbonates, esters, epoxides, organometallics, or combinations thereof.

8. The method of claim 7, wherein the passivation agent comprises an epoxide selected from epoxyhexane and epoxydodecane.

9. The method of claim 8, wherein the aluminum nanoparticles have a size of from about 20 nm to about 30 nm.

10. The method of claim 1, wherein the organic outer shell comprises oleic acid.

11. The method of claim 10, wherein the aluminum nanoparticles are about 40% by weight inner aluminum core, about 35% by weight organic shell, and about 25% by weight oxide shell, based on the total weight of the aluminum nanoparticles.

12. A method of generating hydrogen gas comprising:
providing stabilized aluminum nanoparticles formed by decomposing an alane precursor in the presence of a catalyst and an organic or organometallic passivating agent, the stabilized aluminum nanoparticles having a face-centered cubic crystal structure comprising an inner aluminum core surrounded by an oxide shell and an organic outer shell; and
reacting the nanoparticles with water, wherein the reaction provides a hydrogen yield of at least 85%.

13. The method of claim 12, wherein the alane precursor is selected from dimethylethylamine alane and 1-methylpyrrolidone alane.

14. The method of claim 12, wherein the catalyst comprises titanium (iv) isopropoxide.

15. The method of claim 12, wherein the alane precursor is selected from dimethylethylamine alane and 1-methylpyrrolidone alane; and the catalyst comprises titanium (iv) isopropoxide.

16. The method of claim 15, wherein the organic outer shell comprises oleic acid.

* * * * *